(12) United States Patent
Serbanati (10) Patent No.: US 12,317,079 B2
(45) Date of Patent: May 27, 2025

(54) APPARATUS, A METHOD AND A COMPUTER PROGRAM FOR VERIFYING AN INTEGRITY OF A DEVICE CONNECTED TO A TELECOMMUNICATION NETWORK

(71) Applicant: Sony Group Corporation, Tokyo (JP)

(72) Inventor: Alexandru Serbanati, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 251 days.

(21) Appl. No.: 17/796,262

(22) PCT Filed: Mar. 4, 2021

(86) PCT No.: PCT/EP2021/055456
§ 371 (c)(1),
(2) Date: Jul. 29, 2022

(87) PCT Pub. No.: WO2021/180557
PCT Pub. Date: Sep. 16, 2021

(65) Prior Publication Data
US 2023/0066406 A1 Mar. 2, 2023

(30) Foreign Application Priority Data

Mar. 13, 2020 (EP) .................................... 20163087

(51) Int. Cl.
*H04W 12/08* (2021.01)
*H04W 12/037* (2021.01)
*H04W 12/108* (2021.01)

(52) U.S. Cl.
CPC ....... *H04W 12/108* (2021.01); *H04W 12/037* (2021.01)

(58) Field of Classification Search
CPC .......................... H04W 12/108; H04W 12/037
See application file for complete search history.

(56) References Cited

U.S. PATENT DOCUMENTS

| | | | |
|---|---|---|---|
| 2011/0035604 A1* | 2/2011 | Habraken | G07F 7/1016 235/382 |
| 2015/0134552 A1* | 5/2015 | Engels | G06Q 10/087 705/318 |
| 2015/0263855 A1 | 9/2015 | Schulz | |

(Continued)

FOREIGN PATENT DOCUMENTS

| | | |
|---|---|---|
| CN | 107968903 A | 4/2018 |
| WO | 2018/170684 A1 | 9/2018 |

OTHER PUBLICATIONS

International Search Report and Written Opinion mailed on May 3, 2021, received for PCT Application PCT/EP2021/055456, filed on Mar. 4, 2021, 9 pages.

*Primary Examiner* — Darshan I Dhruv
(74) *Attorney, Agent, or Firm* — XSENSUS LLP (57) ABSTRACT

An apparatus for verifying an integrity of a device connected to a telecommunication network. The apparatus comprises at least one transceiver configured to broadcast a signal to the device via a non-network channel outside the telecommunication network for causing the device to provide a response to the signal depending on the integrity of the device. Further, the apparatus comprises an attestation server configured to receive the device's response and verify the integrity of the device depending on the device's response.

11 Claims, 5 Drawing Sheets

(56) References Cited

U.S. PATENT DOCUMENTS

| | | | |
|---|---|---|---|
| 2017/0180341 A1* | 6/2017 | Walker | H04L 9/3242 |
| 2018/0159865 A1* | 6/2018 | Lau | H04W 4/80 |
| 2018/0323971 A1* | 11/2018 | Liu | H04W 12/0431 |
| 2019/0149539 A1 | 5/2019 | Scruby | |
| 2019/0289463 A1* | 9/2019 | Glouche | G06F 21/43 |
| 2019/0364042 A1* | 11/2019 | Liu | H04W 12/069 |
| 2020/0007540 A1* | 1/2020 | Kawaguchi | H04L 9/0861 |
| 2020/0099748 A1* | 3/2020 | Cambridge | H04L 67/125 |

* cited by examiner

APPARATUS, A METHOD AND A COMPUTER PROGRAM FOR VERIFYING AN INTEGRITY OF A DEVICE CONNECTED TO A TELECOMMUNICATION NETWORK

CROSS-REFERENCE TO RELATED APPLICATIONS

The present application is based on PCT filing PCT/EP2021/055456, filed Mar. 4, 2021, which claims priority to EP 20163087.8, filed Mar. 13, 2020, the entire contents of each are incorporated herein by reference.

FIELD

Embodiments of the present disclosure relate to an apparatus for verifying an integrity of a device connected to a telecommunication network. In particular, embodiments of the present disclosure may relate to a technique for a remote attestation of a device.

BACKGROUND

Remote attestation is a security feature enabling a validation of the integrity of a device from remote. In attestation, one party (appraiser) makes a decision about the integrity of another entity (target). This decision is based on the appraiser's evaluation of characteristics, capabilities or behavior of the target.

Attestation from remote is crucial for the Internet of Things paradigm in which devices can be in remote places within an environment.

Especially, cameras may be critical components of surveillance systems. The cameras can be a target of malicious actors aiming to either take control of them, disable them or use them to spy upon an environment where they are deployed.

Since a physical security of such cameras often cannot be guaranteed, an attacker may have physical access to the device. Further, the attacker may install malicious software on the cameras or may manipulate a network connection of the cameras to access camera resources and other network resources.

Hence, there may be a demand for an improved concept for verifying an integrity of a device.

SUMMARY

This demand may be satisfied by the subject matter of the appended independent and dependent claims.

According to a first aspect, the present disclosure relates to an apparatus for verifying an integrity of a device connected to a telecommunication network. The apparatus comprises at least one transceiver configured to broadcast a signal to the device via a non-network channel outside the telecommunication network for causing the device to provide a response to the signal depending on the integrity of the device. Further, the apparatus comprises an attestation server configured to receive the device's response and verify the integrity of the device depending on the device's response.

The device can be understood as a node of the telecommunication network. The transceiver can be either connected with the telecommunication network or a stand-alone device which is independent from the telecommunication network.

The telecommunication network may be a wide area network (WAN), a local area network (LAN), a metropolitan area network (MAN), a personal network (PAN), or the like. Alternatively, the term "telecommunication network" may refer to a combination of multiple of the above mentioned network types.

Further, the term "telecommunication network" as used herein refers not only to systems in which remote devices are coupled via one or more communication paths, but also to stand-alone devices that may be coupled from time to time with the telecommunication network.

The non-network channel can be understood as a communication path between the transceiver and the device outside the telecommunication network.

The signal can include a challenge to which the device can respond if the device is not manipulated or damaged. On the one hand, the response may refer to an appropriate or an inappropriate response to the challenge, but, on the other hand, the response may also refer to an absence of any reaction to the challenge.

For example, in some cases, the device may not be able to receive the signal and thus, to respond to the signal if an attacker physically manipulated or damaged the device.

In other cases, the device may not be able to respond to the signal appropriately, as the device, for example, cannot access specific cryptographic data for solving the challenge due to a software-based manipulation of the device. For this, it may be assumed that the attacker, for example, cannot recover nor use the cryptographic data from the device for pretending the integrity of the device.

Thus, a confirmation of the integrity of the device can fail due to an inappropriate response or if the device cannot provide any response to the attestation server. In this way, the attestation server can recognize a manipulation which caused the damage or the manipulation of the device.

In this way, the apparatus can not only provide a detection of physical attacks, but also a detection of cyberattacks like, for example, a manipulation of a software of the device or its connection to the telecommunication network.

For example, the apparatus can deny the integrity of the device if it has lost a connection to the attestation server (due to malfunctioning or due to malicious action).

Further, the apparatus can be used to detect an attacker which has physical control of the device.

According to a second aspect, the present disclosure relates to a method for verifying an integrity of a device connected via a telecommunication network. The method comprises broadcasting a signal to the device via a non-network channel independent of the telecommunication network for causing the device to provide a response to the signal depending on the integrity of the device. Further, the method comprises verifying the integrity of the device depending on the response to the signal.

The method, for example, can be executed by the previously described apparatus. Accordingly, some aspects described in connection with the apparatus can also relate to the method.

According to a third aspect, the present disclosure relates to a computer program comprising instructions, which, when the computer program is executed by a processor cause the processor to carry out the method described above.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

A device which is connected to a telecommunication network can be in danger of being manipulated in multiple ways.

An attacker, for example:

can get physical access to the camera in order to manipulate the camera physically;

can access the telecommunication network; and/or install arbitrary malicious software on the device. Devices running illegitimate software can be referred to as "compromised".

Hence, there may be a demand for an improved concept for verifying an integrity of a device.

A basic idea of the present disclosure is to establish a concept for collaborative attestation of remotely deployed devices by using an indirect verification scheme and in some cases a combination of the indirect and a direct verification scheme.

Direct verification schemes foresee sending a first challenge from an attestation server to a device via a telecommunication network. To this end, existing remote attestation protocols can be used.

Indirect attestation schemes provide for communicating a second challenge from the attestation server to a transceiver. The second challenge can be transmitted to the transceiver in form of a message via the network communication channel. Upon reception of the message, the transceiver may forward the second challenge on an (off-band) optical channel outside the telecommunication network to the device.

The direct and the indirect verification scheme can be used jointly such that, for example, a response of the device to the second challenge involves knowledge of the first challenge and/or a response to the first challenge.

Figure 1A:
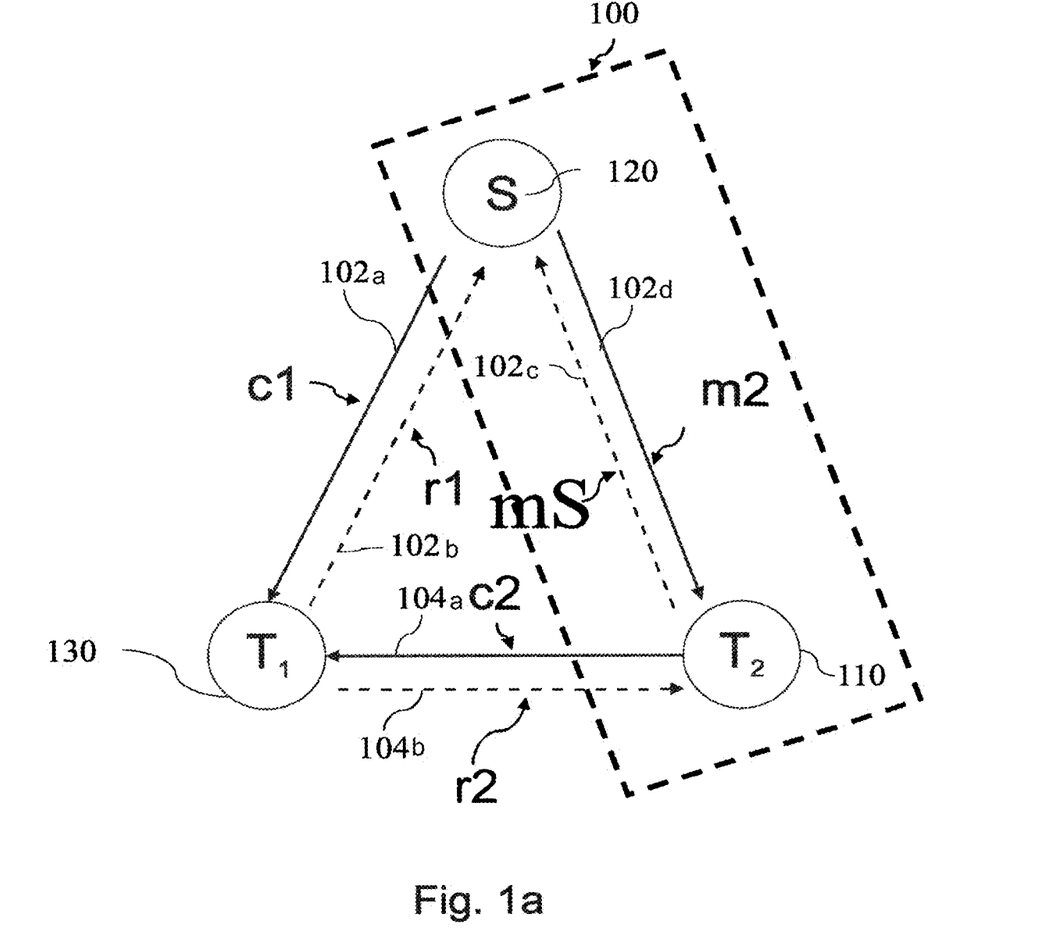
FIG. 1a illustrates schematically an apparatus for verifying an integrity of a device connected to a telecommunication network.

FIG. 1 a illustrates an apparatus 100 for verifying an integrity of a device 130 connected to a telecommunication network 102 (e.g., 102a, 102b, 102c, and 102d).

The apparatus 100 comprises a transceiver 110 configured to broadcast a signal including a challenge c2 to the device 130 via a non-network channel 104 (e.g., 104a and 104b) outside the telecommunication network 102. In this way, the signal may challenge the device 130 to provide a response r1 via the telecommunication network 102 to an attestation server 120 for verifying the integrity of the device 130.

Figure 1B:
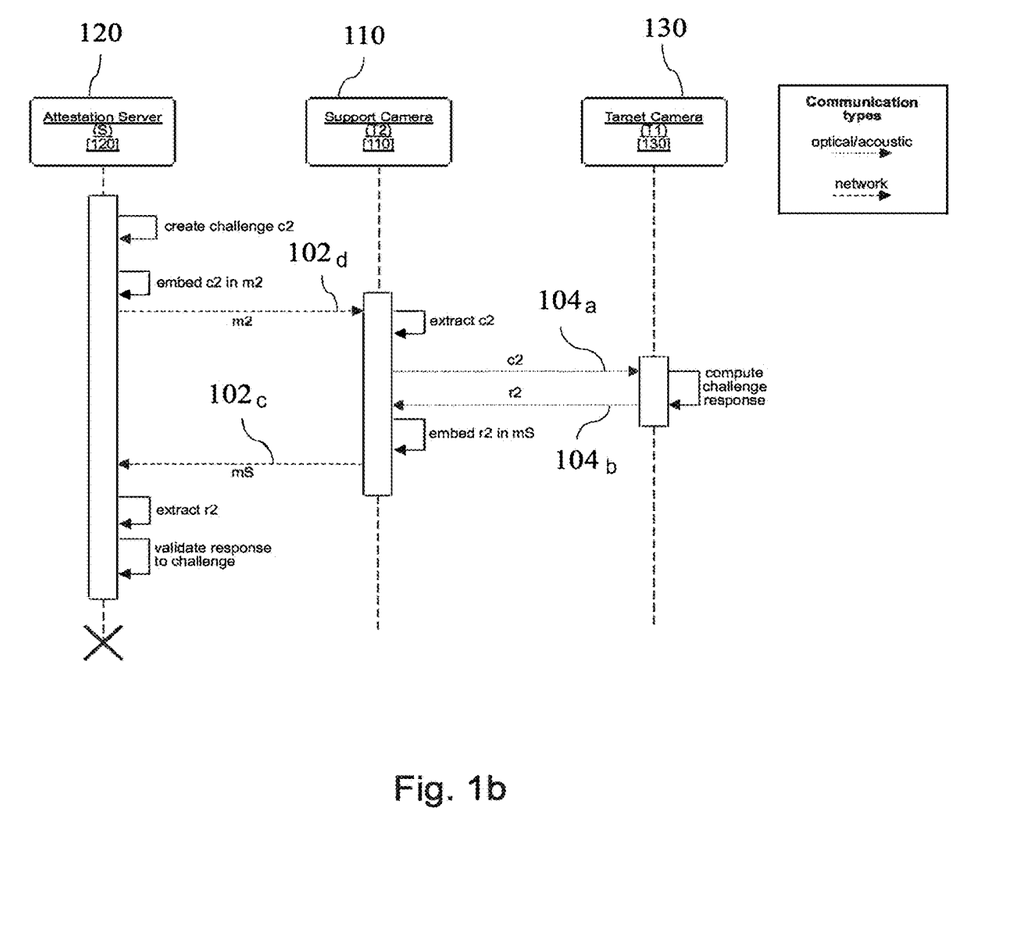
FIG. 1b shows an attestation sequence diagram schematically illustrating a challenge response mechanism for verifying the integrity of the device.

Alternatively or additionally, the device 130 can provide a response r2 via the non-network channel 104 to the attestation server 120 to prove its integrity, as illustrated in the following by reference an attestation sequence diagram from FIG. 1b.

The attestation server 120 can create and embed the challenge c2 in a message m2 and transmit the message m2 to the transceiver 110 via the telecommunication network 102.

To prevent non-authorized entities from accessing the message m2, the attestation server 120 can encrypt the message m2 with a first encryption key. In this way, a possible attacker may not be able to reproduce the signal for surreptitious purposes using the message m2.

The transceiver 110, for example, extracts the challenge c2 from the message m2 using a first decryption key and broadcasts a signal including the challenge c2 via the non-network channel 104 to the device 130.

In this way, a possible attacker may not be able to reproduce the challenge c2 from the first message m2 for surreptitious purposes.

In some embodiments, the first encryption and the first decryption key may correspond to a public and a private key of an asymmetric key pair. In further embodiments, those both may correspond to a symmetric (cryptographic key).

For example, if the device 130 is not manipulated, it is able solve the challenge c2 for providing the response r2 to the transceiver 110 via the non-network channel 104. In this case, the transceiver 110 can embed the response r2 in another message mS and provide the message mS to the attestation server 120 via the telecommunication network 102. Subsequently, the attestation server 120 can extract the response r2 from the message mS for verifying the device's 130 integrity using the response r2.

Alternatively, the attestation server 120 can use both the response r1 and the response r2 for verifying the integrity, as can be seen from FIG. 1a.

The challenge c2 can be configured such that the device 130 cannot solve the challenge c2 and thus, provide the response r1 and/or r2 if the device 130 is manipulated or damaged. For example, the device 130 may need to access cryptographic data to solve the challenge c2, wherein the device 130 can only access the cryptographic data if the device 130 is not manipulated or damaged.

If the response r1 and/or r2 corresponds to an expected response, the attestation server 120 can confirm the integrity of the device 130. Otherwise, for example, if the attestation server 120 receives no or an incorrect response from the device 130, the attestation server may cast doubt on the integrity of the device 130.

In other words, the response r1 and/or r2 to the challenge c2 can provide a proof that the device 130 is deployed in its intended place, i.e. it was not moved, and that, for example, an attestation software is still installed on the device 130 to enable the device 130 to access and use the cryptographic data for proving its integrity.

In this way, the apparatus 100 can detect if the attacker manipulated the device 130, the non-network channel 104, the telecommunication network 102 and/or a connection between the attestation server 120 and the device 130. The attacker, for example, uses a wormhole attack for "bypassing" the device 130.

In connection with the response r1, the apparatus 100 especially can detect a manipulation of the connection between the attestation server 120 and the device 130. With the response r2, the apparatus 100 particularly can detect a (physical) manipulation directed to the non-network channel 104.

In addition, the aforementioned concept may enable the attestation server 120 to detect an attack on the transceiver 110 or a network path between the attestation server 120 and the transceiver 110 if the transceiver 110 is not able to receive the message m2, to receive the response r2 and/or to generate the signal.

In some cases, the challenge c2 may require an additional input to the device 130 for providing the response r1 and/or r2. As can be seen from FIG. 1a, in such cases, the attestation server 120 can provide the device 130 with another challenge c1, which can be solved by the device 130 if, for example, a software of the device 130 is not manipulated. For this, the attestation server 120 can embed the challenge c1 in another message which is sent to the device 130. A solution of the challenge c1, then, can enable the device 130 to provide the response r1 and/or.

The solution of the challenge c1, for example, comprises (encrypted) information which can be used to respond to the challenge c2.

This may unveil whether the software of the device 130 has been manipulated if the device 130 is not able to solve the challenge c1 for providing the response r1 and/or r2.

In order to prevent non-authorized entities from accessing the challenge c1, the attestation server 120 can encrypt the message including the challenge c1 using a second encryption key. Consequently, the device 130 may decrypt the message including the challenge c1 using a second decryption key to extract the challenge c1.

Again, the second encryption key and the second decryption key may correspond to an asymmetric key pair or a symmetric key.

The signal, for example, comprises a light signal generated by a light source of the transceiver 110. The light signal can be a visible or a non-visible electromagnetic signal. Hence, a wavelength or a wavelength range of the light signal can be in a visible wavelength range (approximately between 380 and 760 nm) or in a non-visible wavelength range (e.g. infrared range, microwave range, ultra-violet range, etc.) of the electromagnetic spectrum.

Alternatively, the signal can comprise an acoustic signal. The acoustic signal, for example, is an audible or a non-audible acoustic signal which can be generated by a speaker of the transceiver 110.

Accordingly, the device 130 can comprise a photosensitive sensor or a sound transducer to capture the light signal and/or the acoustic signal, respectively.

The apparatus 100, for example, is able to determine whether the sensor of the device 130 and/or the device 130 itself has been damaged, manipulated or moved out of a field of view of the sensor such that the sensor is not able to capture the light signal. As a consequence, the attestation server 120 can detect a physical manipulation of the device 130 if the device 130 is not able to respond to the light signal.

Analogously, the attestation server 120 can determine whether the light source and/or the transceiver 110 has been manipulated.

If the signal comprises an acoustic signal, the sensor of the device does not need to be in the field of view of the sensor but (only) within a range of the acoustic signal. Thus, the transceiver 110 and the device 130, for example, can be placed in different rooms of a building and the attestations server 120 can detect if the transceiver has been moved or the device 130 has been removed from the range of the acoustic signal.

For embodiments in in which the signal is broadcasted as a light signal or as an acoustic signal, the non-network channel can be understood as an optical channel or an acoustic/sonic channel, respectively.

Accordingly, the transceiver 110 and the device 130, for example, comprise another light source and another photosensitive sensor, respectively, to communicate the response r2 via the non-network channel 104. Broadcasting the response r2 via the optical channel to the transceiver 110 allows further to verify the transceiver's 110 integrity. For example, this allows to check whether the transceiver 110 has not been moved or blocked such that it cannot receive the response r2 via the optical channel.

Figure 2A:
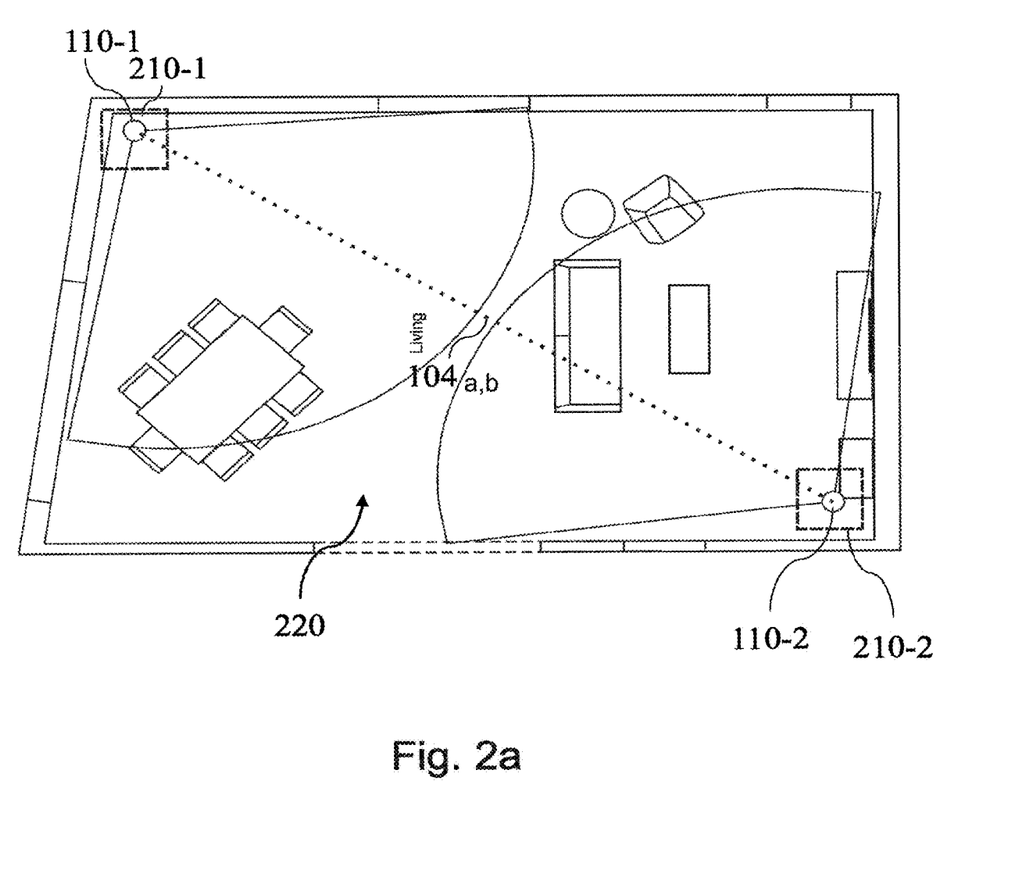
FIG. 2a illustrates an application of the apparatus in connection with two (surveillance) cameras.
Figure 2B:
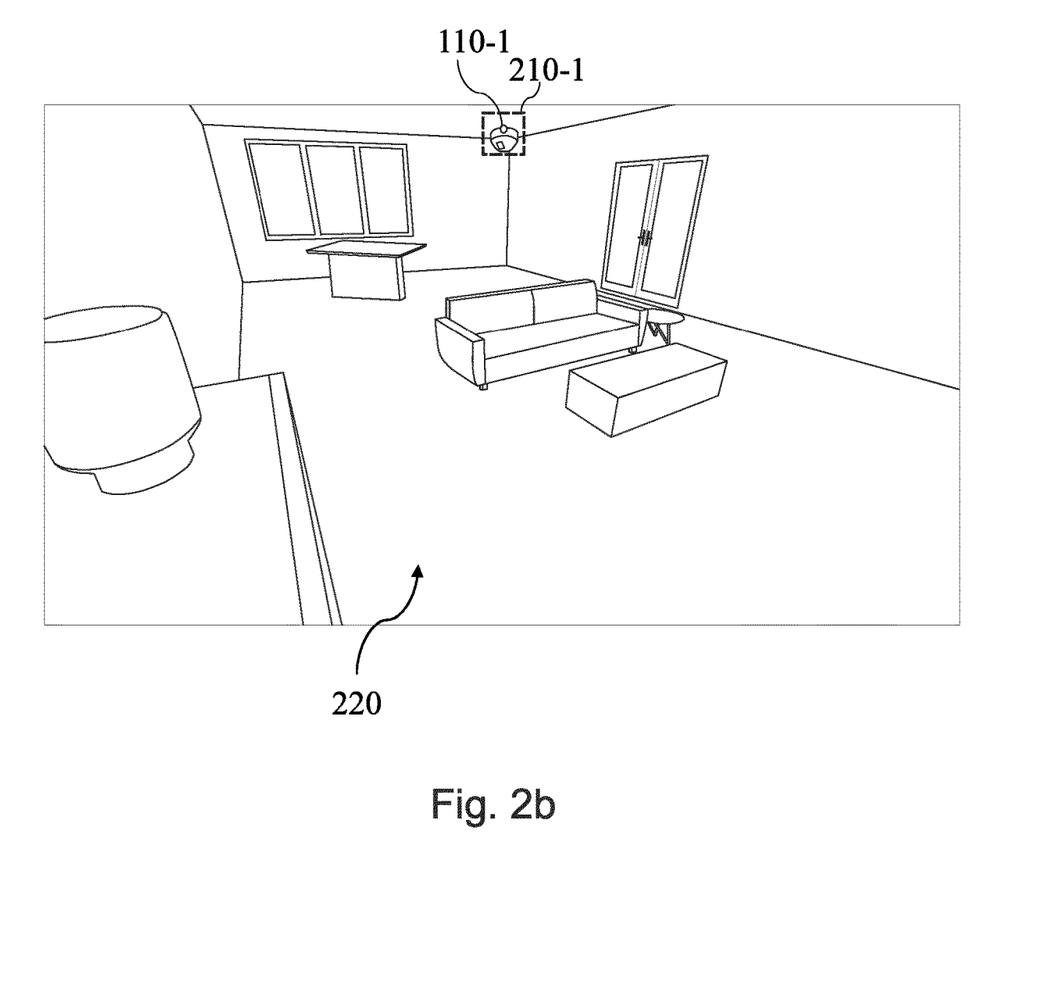
FIG. 2b illustrates a view of one of the two cameras.

The aforementioned concept can further be used for a so-called "collaborative attestation" of multiple devices placed in a mutual environment, as stated in more detail by reference to FIG. 2a and FIG. 2b.

FIG. 2a and FIG. 2b show a living room 220 including a first (surveillance) camera 210-1 comprising a first transceiver 110-1 and a second (surveillance) camera 210-2 comprising a second transceiver 110-2. Moreover, both cameras are in each other's field of view, as illustrated in FIG. 2b depicting a view of the second camera 210-2.

In the embodiment of FIG. 2a and FIG. 2b, the first transceiver 110-1 can be seen as the above described transceiver 110 which in this case is used for an attestation of an integrity of the second surveillance camera 210-2.

Vice versa, the second transceiver 110-2 can be used for an attestation of an integrity of the first surveillance camera 210-1, as described in in more detail in the following.

Similar to the first transceiver 110-1, the second transceiver 110-2 can be connected to the telecommunication network 102 to receive a third message from the attestation server 120 via the telecommunication network 102 and broadcast a signal indicative of the third message to the first transceiver 110-1 via the non-network channel 104.

As stated in connection with the above embodiment, the first transceiver 110-1 can comprise a first light source configured to broadcast the (light) signal indicative of the first message via the non-network channel 104 to the second transceiver 110-2. Likewise, the second transceiver 110-2 may comprise a second light source configured to broadcast the (light) signal indicative of the third message via the non-network channel 104 to the first transceiver 110-1.

Preferably, the first and the second transceiver 110-1 and 110-2 each uses an imaging sensor of the first and the second (surveillance) camera 210-1 and 210-2, respectively, to spare additional photosensitive sensors for receiving the light signals of each other.

Analogously to aforementioned embodiments, the attestation server 120 can transmit, to the first transceiver 110-1, via the telecommunication network a fourth message causing the first transceiver 110-1 to provide to the attestation server 120 a response to the signal indicative of the third message depending on the integrity of the first transceiver 110-1.

Consequently, the attestation server 120 can verify the integrity of the first transceiver 110-1 and/or of the first (surveillance) camera 210-1 depending on the response to the signal indicative of the third message.

Thus, the first transceiver 110-1 and the second transceiver 110-2 can be used to attest the integrity of each other. In connection with the application described in FIGS. 2a and 2b, the first and the second transceiver 110-1 and 110-2 may further be used to attest the integrity of the first and the second surveillance camera 210-1 and 210-2, respectively.

In further use cases, the concept described in connection with the two surveillance cameras 210-1 and 210-2 can be applied for a collaborative attestation of integrities of more than two cameras.

For example, three cameras can be placed within each other's fields of view such that the integrity of one of the cameras can be attested by one or each of the other cameras. This, for example, allows an additional confirmation of the attestation.

Additionally, the other cameras can be used for a complimentary (visual) attestation to inherently increase the confidence level of the overall integrity validation. In doubt of the integrity of one of the cameras, the other cameras deployed in the environment can be used to acquire images of the deployment scene for providing remotely information about the deployment scene.

Figure 3:
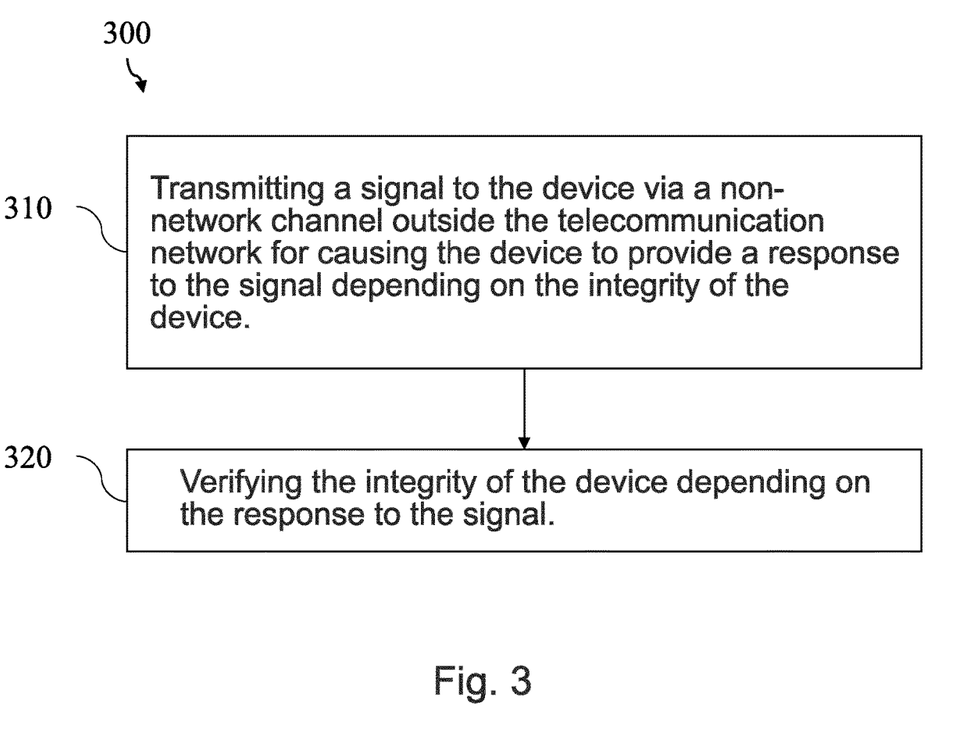
FIG. 3 illustrates a method for verifying an integrity of a device connected to a telecommunication network.

FIG. 3 schematically illustrates a method 300 for verifying an integrity of a device connected to a telecommunication network.

The method 300 comprises broadcasting 310 a signal to the device via a non-network channel outside the telecommunication network for causing the device to provide a response to the signal depending on the integrity of the device.

Further, the method 300 comprises verifying 320 the integrity of the device depending on the response to the signal.

The method 300, for example, can be carried out by the aforementioned apparatus 100. Hence, some embodiments of the method 300 may incorporate one or multiple features described in connection with the apparatus 100.

For example, the method 300 may further comprise transmitting a message to the device via the telecommunication network, the message enabling the device to provide the response to the signal depending on the integrity of the device.

The method 300 can be executed using a computer program.

On a camera side, the method can be at least partly carried out, for example, by running a software client securely on the cameras. The software client can detect communication from other cameras through executing an optical protocol and, for example, controls the light source and the transceiver 110, 110-1 or 110-2 in accordance with a predefined communication protocol.

The optical protocol, for example, comprises a set of rules enabling the cameras to exchange information over the optical channel. The chosen or specifically-designed protocol should support bi-directional communication.

On an attestation server side, the attestation server may run an attestation software creating messages m2 and/or c2 and evaluating the responses returned from the cameras/device. The attestation software, for example, implements an attestation protocol comprising a set of rules that enables the attestation server 120 to verify through a challenge-response mechanism that the cameras can perform the attestation via the optical channel.

The following examples pertain to further embodiments:
(1) An apparatus for verifying an integrity of a device connected to a telecommunication network, the apparatus comprising:
  at least one transceiver configured to broadcast a signal to the device via a non-network channel outside the telecommunication network for causing the device to provide a response to the signal depending on the integrity of the device; and
  an attestation server configured to:
    receive the device's response; and
    verify the integrity of the device depending on the device's response.
(2) Apparatus of (1), wherein the attestation server is further configured to transmit a message to the device via the telecommunication network, the message enabling the device to provide the response to the signal depending on the integrity of the device.
(3) Apparatus of any of (1) or (2), wherein the signal comprises at least one of a light signal and an acoustic signal.
(4) Apparatus of any of (1) to (3),
  wherein the attestation server is further configured to transmit a first message via the telecommunication network to the transceiver;
  wherein the transceiver is further configured to:
    broadcast the signal to the device via the non-network channel, wherein the signal is indicative of the first message; and
  wherein the attestation server is further configured to:
    transmit, to the device, via the telecommunication network a second message enabling the device to provide the response to the signal to the attestation server depending on the integrity of the device; and
    verify the integrity of the device depending on the response to the signal.
(5) Apparatus of any one of (1) to (4), wherein the attestation server is configured to receive the response via the telecommunication network from the device.
(6) Apparatus of any one of (1) to (5),
  wherein the transceiver is configured to receive the response via the non-network channel; and transmit the response to the attestation server via the telecommunication network.

(7) Apparatus of any one of (4) to (6),
wherein the attestation server is further configured to
encrypt the first message with a first encryption key; and
encrypt the second message with a second encryption key,
wherein the transceiver is configured to decrypt the first message using a first decryption key; and
wherein the second message is decipherable by the device using a second decryption key.

(8) Apparatus of any one of (1) to (7),
wherein the transceiver is a first transceiver; and
wherein the apparatus further comprises at least one second transceiver configured to:
receive a third message from the attestation server via the telecommunication network; and
broadcast a signal indicative of the third message to the first transceiver via the non-network channel,
wherein the attestation server is further configured to:
transmit, to the first transceiver, via the telecommunication network a fourth message causing the first transceiver to provide to the attestation server a response to the signal indicative of the third message depending on the integrity of the first transceiver; and
verify the integrity of the first transceiver depending on the response to the signal indicative of the third message.

(9) Apparatus of (8),
wherein the first transceiver comprises:
a first light source configured to broadcast, to the second transceiver, the signal indicative of the first message via the non-network channel; and
a first camera configured to receive the signal indicative of the third message via the non-network channel; and
wherein the second transceiver comprises:
a second light source configured to broadcast to the first transceiver the signal indicative of the third message via the non-network channel;
a second camera configured to receive the signal indicative of the first message via the non-network channel.

(10) A method for verifying an integrity of a device connected via a telecommunication network, comprising:
broadcasting a signal to the device via a non-network channel outside the telecommunication network for causing the device to provide a response to the signal depending on the integrity of the device; and
verifying the integrity of the device depending on the response to the signal.

(11) Method of (10), further comprising:
transmitting a message to the device via the telecommunication network, the message enabling the device to provide the response to the signal depending on the integrity of the device.

(12) A computer program comprising instructions, which, when the computer program is executed by a processor cause the processor to carry out the method of any one of (10) and (11).

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. An apparatus for verifying an integrity of a device connected to a telecommunication network, the apparatus comprising:
   a first transceiver;
   a second transceiver;
   an attestation server; and
   processing circuitry configured in combination with the first and second transceiver to
   broadcast, by the first transceiver, a signal to the device via a non-network channel outside the telecommunication network for causing the device to provide a response to the signal depending on the integrity of the device,
   receive, by the second transceiver, a third message from the attestation server via the telecommunication network, and
   broadcast, by the second transceiver, a signal indicative of the third message to the first transceiver via the non-network channel,
   wherein the attestation server is configured to:
      receive the device's response;
      verify the integrity of the device depending on the device's response;
      transmit, to the first transceiver, via the telecommunication network a fourth message causing the first transceiver to provide to the attestation server a response to the signal indicative of the third message depending on the integrity of the first transceiver; and
      verify the integrity of the first transceiver depending on the response to the signal indicative of the third message.
2. The apparatus of claim 1, wherein the attestation server is further configured to transmit a message to the device via the telecommunication network, the message enabling the device to provide the response to the signal depending on the integrity of the device.
3. The apparatus of claim 1, wherein the signal comprises at least one of a light signal and an acoustic signal.
4. The apparatus of claim 1,
   wherein the attestation server is further configured to transmit a first message via the telecommunication network to the transceiver;
   wherein the transceiver is further configured to:
      broadcast the signal to the device via the non-network channel, wherein the signal is indicative of the first message; and
   wherein the attestation server is further configured to:
      transmit, to the device, via the telecommunication network a second message enabling the device to provide the response to the signal to the attestation server depending on the integrity of the device; and
      verify the integrity of the device depending on the response to the signal.
5. The apparatus of claim 1, wherein the attestation server is configured to receive the response via the telecommunication network from the device.
6. The apparatus of claim 1,
   wherein the transceiver is configured to
   receive the response via the non-network channel; and
   transmit the response to the attestation server via the telecommunication network.
7. The apparatus of claim 4,
   wherein the attestation server is further configured to
   encrypt the first message with a first encryption key; and
   encrypt the second message with a second encryption key,
   wherein the transceiver is configured to decrypt the first message using a first decryption key; and
   wherein the second message is decipherable by the device using a second decryption key.
8. The apparatus of claim 1,
   wherein the first transceiver comprises:
      a first light source configured to broadcast, to the second transceiver, the signal indicative of the first message via the non-network channel; and
      a first camera configured to receive the signal indicative of the third message via the non-network channel; and
   wherein the second transceiver comprises:
      a second light source configured to broadcast to the first transceiver the signal indicative of the third message via the non-network channel;
      a second camera configured to receive the signal indicative of the first message via the non-network channel.
9. A method for verifying an integrity of a device connected via a telecommunication network, comprising:
   broadcasting, by a first transceiver, a signal to the device via a non-network channel outside the telecommunication network for causing the device to provide a response to the signal depending on the integrity of the device;
   receiving, by a second transceiver, a third message from an attestation server via the telecommunication network;
   broadcasting, by the second transceiver, a signal indicative of the third message to the first transceiver via the non-network channel;
   verifying, by the attestation server, the integrity of the device depending on the response to the signal;

transmitting, to the first transceiver, via the telecommunication network a fourth message causing the first transceiver to provide to the attestation server a response to the signal indicative of the third message depending on the integrity of the first transceiver; and verifying the integrity of the first transceiver depending on the response to the signal indicative of the third message.

10. The method of claim 9, further comprising:

transmitting a message to the device via the telecommunication network, the message enabling the device to provide the response to the signal depending on the integrity of the device.

11. A non-transitory computer-readable storage medium storing computer-readable instructions thereon which, when executed by a processor, cause the processor to carry out a method, the method comprising:

broadcasting, by a first transceiver, a signal to a device via a non-network channel outside a telecommunication network for causing the device to provide a response to the signal depending on an integrity of the device;

receiving, by a second transceiver, a third message from an attestation server via the telecommunication network;

broadcasting, by the second transceiver, a signal indicative of the third message to the first transceiver via the non-network channel;

verifying, by the attestation server, the integrity of the device depending on the response to the signal;

transmitting, to the first transceiver, via the telecommunication network a fourth message causing the first transceiver to provide to the attestation server a response to the signal indicative of the third message depending on the integrity of the first transceiver; and verifying the integrity of the first transceiver depending on the response to the signal indicative of the third message.

\* \* \* \* \*